United States Patent
Emelyanov et al.

(10) Patent No.: US 11,385,807 B1
(45) Date of Patent: Jul. 12, 2022

(54) SYSTEM AND METHOD FOR RECOVERING A NODE IN A CLOUD INFASTRUCTURE AFTER AN INTRUSION

(71) Applicant: Virtuozzo International GmbH, Schaffhausen (CH)

(72) Inventors: Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 381 days.

(21) Appl. No.: 16/731,988

(22) Filed: Dec. 31, 2019

(51) Int. Cl.
 *G06F 21/51* (2013.01)
 *G06F 3/06* (2006.01)
 *G06F 9/30* (2018.01)
 *G06F 9/38* (2018.01)
 *H04L 9/40* (2022.01)
 *G06F 21/55* (2013.01)

(52) U.S. Cl.
 CPC ............ *G06F 3/0622* (2013.01); *G06F 3/067* (2013.01); *G06F 3/0631* (2013.01); *G06F 9/3017* (2013.01); *G06F 9/3891* (2013.01); *G06F 21/55* (2013.01); *H04L 63/1441* (2013.01)

(58) Field of Classification Search
 CPC ...... G06F 21/55; G06F 9/3891; G06F 21/566; G06F 2009/45587; G06F 21/56; H04L 63/1441; H04L 63/1416; H04L 63/1425; H04L 63/14
 See application file for complete search history.

(56) References Cited

U.S. PATENT DOCUMENTS

| | | | | |
|---|---|---|---|---|
| 9,977,898 B1 * | 5/2018 | Folco | ...................... | G06F 21/53 |
| 10,146,936 B1 * | 12/2018 | Khanduja | ........... | G06F 9/45558 |
| 10,936,717 B1 * | 3/2021 | Herman Saffar | ... | H04L 63/1408 |
| 2019/0028490 A1 * | 1/2019 | Chen | .................. | G06F 9/45558 |
| 2021/0216408 A1 * | 7/2021 | Huskisson | .......... | G06F 11/3037 |

* cited by examiner

*Primary Examiner* — Ali S Abyaneh
(74) *Attorney, Agent, or Firm* — ArentFox Schiff LLP; Michael Fainberg

(57) ABSTRACT

Disclosed herein are systems and method for recovering a computing device after an intrusion is detected. In one aspect, an exemplary method comprises, by a minimalistic operating system running on the computing device, deploying a master container, wherein the deploying of the master container comprises creating and starting the master container from a container image, providing, to the master container, access to a storage area network (SAN) volume, providing, to the master container, read-only access to a Distributed Configuration Management (DCM) module domain, the domain being where a configuration of the computing device is stored, and invoking an Intrusion Detection Module (IDM) to start detecting intrusions into the master container; and upon receiving a notification from the IDM, re-deploying, by the minimalistic OS, the master container from the container image, wherein the deployed master container acts as a default runtime environment on the computing device.

20 Claims, 5 Drawing Sheets

SYSTEM AND METHOD FOR RECOVERING A NODE IN A CLOUD INFASTRUCTURE AFTER AN INTRUSION

TECHNICAL FIELD

The present disclosure is generally related to the field of detection of network intrusion, e.g., by a malicious software, and recovery using a cloud based network infrastructure.

BACKGROUND

A network node, e.g., a host computing device, of a cloud infrastructure may be attacked by a malicious third party. Thus, there is a need for timely intrusion detection and remedy. Network administrators spend resources on various ways of addressing these types of network concerns.

Network administrators attempt to detect the intrusion as soon as it occurs and avoid any subsequent impact. The ultimate goal is to instantly detect an attempt and entirely avoid the intrusion. There are several techniques developed based on this approach. For example, firewalls, monitors, security modules, intrusion detection systems, etc., may be installed to prevent the intrusion. Each technique has its own limitations, merits, and issues.

First, regardless of the technique, there is always a non-zero gap in time between the protection technique being bypassed and the subsequent detection of the intrusion. During this non-zero time gap, the system is at least partially controlled by the unwanted third party. Moreover, even after the intrusion is detected, there is still some time during which effort is extended to fight against the intruder in order to regain all control. During the effort to recover the control, the intruder has at least some control over the system.

Second, typically, the intrusion is not detected and stopped at the beginning. Thus, by the time the detection occurs, the node is at least partially affected. For example, the node may be misconfigured, infected by a malicious software, etc. Therefore, the node needs to be returned back to its normal operation. The scope of the destruction is typically difficult to define and recovery often involves several tasks, e.g., manually fixing the system (e.g., fix the configurations), restoring systems from a backup, using redeployment and auto-configurations systems, and the like. These techniques also have their own limitations, pitfalls and issues. For instance, manually fixing the system may not reveal all the problems and some changes may not be notices until sometime has passed. Restoring the system from the backup may restore data that was compromised long ago, redeployment may result in important data being lost, etc.

Therefore, the existing approaches have shortcomings that allow the system to be compromised at least for some time and/or make recovery of the node incomplete. Thus, there is a need for an optimal method and system for recovering a node after an intrusion is detected.

SUMMARY

Accordingly, a method is provided for recovering a computing device after an intrusion is detected. In one aspect, the method comprises a minimalistic Operating System (OS) running on a computing device, the device having a processor and a memory, wherein the minimalistic OS deploys a master container by: (1) creating and starting the master container from a container image, (2) providing, to the master container, access to a storage area network (SAN) volume, (3) providing, to the master container, read-only access to a Distributed Configuration Management (DCM) module domain, the domain being where a configuration of the computing device is stored, and (4) invoking an Intrusion Detection Module (IDM) to start detecting intrusions into the master container, and upon receiving a notification from the IDM about an intrusion into the computing device, the minimalistic OS re-deploys the master container from the container image, wherein the deployed master container acts as a default runtime environment on the computing device.

In one aspect, the computing device acts as a compute node in a cluster, wherein the cluster comprises: a plurality of compute nodes, a storage area network, wherein the DCM is a cluster management module for keeping configurations of compute nodes, and the IDM is a cluster management module for detecting when a compute node is compromised.

In one aspect, the re-deploying of the master container comprises: destroying the master container; creating and starting a new master container from the container image; providing to the newly created master container access to the SAN volume; providing to the newly created master container a read-only access to the DCM domain, the domain being where the configuration of the computing device is stored; and invoking the IDM to start detecting intrusions into the newly created master container, wherein the newly created and deployed master container acts as a default runtime environment on the computing device.

In one aspect, the container image includes at least one of: all software needed for the node to operate, information about needed persistent volume, and information about a corresponding DCM sub-domain.

In one aspect, the minimalistic OS includes: a container management software, and any number of software modules for supporting communication between the minimalistic OS and the SAN, the DCM and the IDM.

In one aspect, the SAN is accessed via a network storage driver of the minimalistic OS of the computing device, and the software module for communicating with the IDM comprises a module for a notification subscription to the IDM, wherein the IDM provides notifications to the minimalistic OS in accordance with a notification subscription by the minimalistic OS of the respective computing device.

In one aspect, the configuration of the computing device stored in the DCM includes at least one of: network configuration files, storage configuration files, user configuration files, and security credentials of the computing device, wherein the security credentials include at least one of: a token, a key, and a password.

In one aspect, the master container is the only container running on the computing device.

In one aspect, the IDM comprises a crontab monitor or an artificial intelligence (AI) based system, and the DCM comprises a Network File System (NFS) share or an eted-system.

In one aspect, the SAN and the DCM are accessible to the computing device only via a private network.

In one aspect, the master container is not allowed to perform any changes in the configuration of the computing device stored on the DCM, the master container has only read-only access to the DCM, the minimalistic OS has a read-write access to the DCM, changes to the configuration of the computing device are performed only from a private network, wherein the private network is inaccessible from a public network, and the DCM is inaccessible from the public network.

In one aspect, the re-deploying of the master container comprises: taking a snapshot of the master container currently in use; and destroying the master container after the snapshot has been taken to allow for analysis of the intrusion.

In one aspect, the providing, to the master container, access to the SAN volume and to the DCM domain comprises: determining a SAN volume and a DCM domain based on the configuration of the computing device; and granting, to the started master container, access to the determined SAN volume and DCM domain.

In one aspect, wherein a virtual machine may be used instead of the container.

In one aspect, the master contain is configured to store data needed by a user of the computing device in a respective volume of the SAN, wherein the stored data includes at least one of: databases of the user, files of the user, and logs.

In one aspect, a system is provided for recovering a computing device after an intrusion is detected, the system comprising a cluster that includes any number of compute nodes having respective processors and memory, a storage area network that comprises a network or shared storage resources, a distributed configuration management module for keeping configurations of the compute nodes of the cluster, an intrusion detection module for detecting intrusions into master containers of compute nodes of the cluster and for notification of a minimalistic OS of the compute node for which the intrusion is detected, the minimalistic OS running being configured to: deploy a master container by: (1) creating and starting the master container from a container image, (2) providing, to the master container, access to a storage area network (SAN) volume, (3) providing, to the master container, read-only access to a Distributed Configuration Management (DCM) module domain, the domain being where a configuration of the computing device is stored, and (4) invoking an Intrusion Detection Module (IDM) to start detecting intrusions into the master container; and upon receiving a notification from the IDM about an intrusion into the computing device, re-deploy the master container from the container image, wherein the deployed master container acts as a default runtime environment on the computing device.

In one aspect, the present disclosure describes a non-transitory computer readable medium storing thereon computer executable instructions for recovering a computing device after an intrusion, including instructions for: deploying a master container by: (1) creating and starting the master container from a container image, (2) providing, to the master container, access to a storage area network (SAN) volume, (3) providing, to the master container, read-only access to a Distributed Configuration Management (DCM) module domain, the domain being where a configuration of the computing device is stored, and (4) invoking an Intrusion Detection Module (IDM) to start detecting intrusions into the master container; and when a notification is received from the IDM, re-deploying the master container from the container image, wherein the deployed master container acts as a default runtime environment on the computing device.

The above summary of example aspects serves to provide an understanding of the teachings of the present disclosure. This summary is not an extensive overview of all contemplated aspects, and is intended to neither identify key or critical elements of all aspects nor delineate the scope of any or all aspects of the disclosure. Its sole purpose is to present one or more aspects in a concise form as a prelude to the more detailed description of the disclosure that follows. To the accomplishment of the foregoing, the one or more aspects of the methods and systems of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the teachings of the present disclosure and, together with the detailed description, serve to explain their principles and implementations.

DETAILED DESCRIPTION

Figure 1:
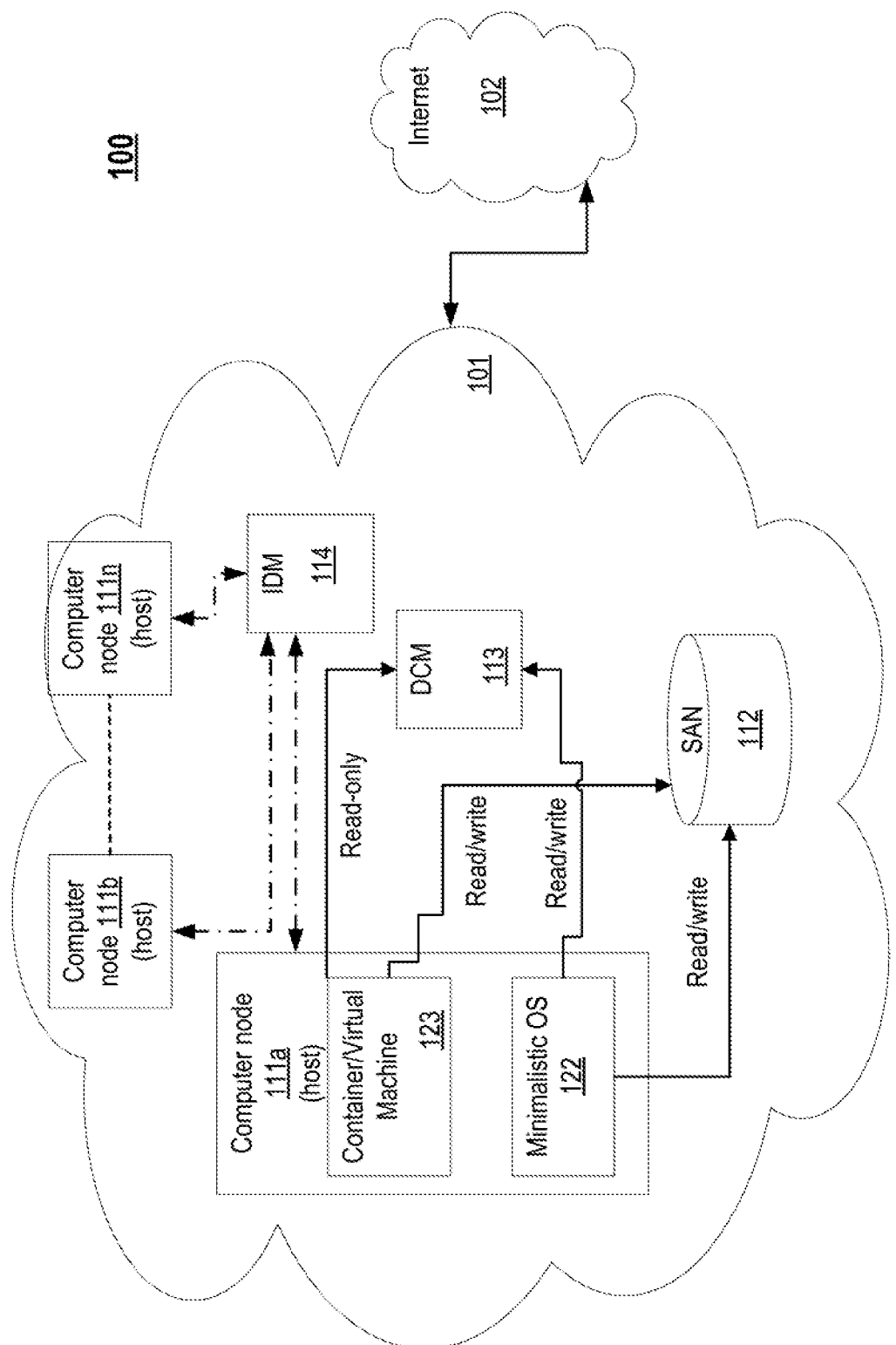
FIG. 1 is a block diagram illustrating a cloud infrastructure in which computing devices with the current method and system are deployed.

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

In one aspect, the present disclosure describes a method and system for recovering a computing device after an intrusion. In one aspect, a cluster comprises a plurality of nodes in a cloud infrastructure. The object is to provide a system and method for recovering (bringing back) any member of the cluster when something happens to the node. For example, the node may be attacked by a malicious software and may have its configuration or data destroyed.

In order to establish the system from which the node may be recovered, the system of the present disclosure comprises:

a single-container-node system (a compute device with the minimalistic OS running on it and a master container deployed on a minimalistic OS) in which the single container (master container) acts as a default runtime environment, a Storage Area Network (SAN) that comprises a network of shared storage devices, a Distributed Configuration Management (DCM) module that is used for keeping configurations of computing devices of the cluster, and an Intrusion Detection Module (IDM) that is used for detecting when a computing device of the cluster is compromised (in one aspect the IDM is not a part of the system, and the system can connect to IDM).

The DCM keeps configurations of computing devices (network nodes), which include configurations of containers. The DCM keeps the configuration of each node in a specific sub-domain. The configuration management includes keeping track of changes and, upon request, sending to the minimalistic OS the appropriate configuration of the respective node.

In one aspect, the DCM may include a simple Network File System (NFS) share or a more sophisticated system, e.g., etcd-like system which is used for critical data.

In one aspect, the IDM may comprise a detection system of any complexity (e.g., starting from a simple crontab monitor which issues simplified commands to be run at a specified time, and till an enterprise level artificial intelligence (AI) based system, and so on).

FIG. 1 is a block diagram illustrating a cloud infrastructure 100 in which computing devices with the current method and system are deployed. For example, the cloud infrastructure 100 contains a cluster of nodes interconnected via an intranet. The nodes in the cluster may transmit and receive data to and from addresses within the intranet as well as to and from external networks, e.g., via the internet. The cluster comprises a plurality of computing devices, at least one Storage Area Network (SAN) that comprises a network of shared storage devices. And a set of cluster management modules including a Distributed Configuration Management (DCM) module that is used for keeping configurations of computing devices of the cluster, and an Intrusion Detection Module (IDM) that is used for detecting when a computing device of the cluster is compromised. For example, the cloud infrastructure 100 may be communicatively coupled with the internet 102 and may contain any number of computing device 111a-111n, SAN 112, DCM 113, IDM 114, and other infrastructure components.

A compute node (e.g., represented by computing device) may be added to the cluster as needed. Adding a node includes setting up a host computer with a minimalistic Operating System (OS), and creating and starting a master container from a container image. In one aspect, the master container is the only container running on the computing device.

In one aspect, the container's software is stored in a container image, the container data is stored in a persistent volume, and container configuration is stored in DCM. Information about the needed persistent volume (e.g., its name) can be stored in the container image, or on SAN, or in configuration on DCM. In one aspect, the persistent volume is stored in SAN. In some aspect, the container image also contains information about DCM domain storing its configuration. The container image itself can be also stored in SAN, or can be downloaded from the intranet or the internet, stored locally or on any distributed storage.

In one aspect, the container image includes at least some of: all the software needed for the node to operate, information about the needed persistent volume, and information about corresponding DCM sub-domain (i.e., sub-domain for the location at which the configuration is kept). For example, all the software needed by the owner is included in the container image. In one aspect, client's data (e.g., databases, clients' files, logs, etc.) are stored in the persistent volume in the SAN.

In one aspect, the minimalistic OS includes: a container management software; and software modules for supporting communication between the minimalistic OS and the SAN, the cluster management modules that are, for example, DCM and the IDM. Returning to FIG. 1, the computing device 111a comprises the minimalistic OS 122 which includes a container management software and a software module for communicating with the SAN 112, DCM 113, IDM 114.

In one aspect, the SAN 112 is accessed via a network storage driver of the minimalistic OS 122. In one aspect, the software module for communicating with the IDM 114 comprises a module for a notification subscription to the IDM 114, wherein the IDM provides notifications to the minimalistic OS 122 in accordance with a notification subscription by the minimalistic OS 122.

Once the master container is started, it is granted access to the SAN volume. The master container is also granted a read-only access to the appropriate DCM domain containing the configuration of the node. In other words, the master container may read the configuration but is not allowed to alter the configuration stored in the DCM. Then, the IDM is invoked to start detecting intrusions into the master container. Note that the IDM tracks intrusion into the master container, not intrusions to the node itself.

In one aspect, granting, to the master container, access to the SAN volume and to the DCM domain comprises: determining a SAN volume and a DCM domain based on the configuration of the computing device; and granting, to the started container, access to the determined SAN volume and DCM domain.

When an intrusion is detected by the IDM, the IDM sends a notification to the minimalistic OS. Upon receiving the notification from the IDM about the intrusion, the minimalistic OS re-deploys the master container from the container image. Note that the deployed master container acts as the default runtime environment on the computing device. The re-deployment includes re-attaching back to the SAN volume and the appropriate DCM domain.

Figure 2:
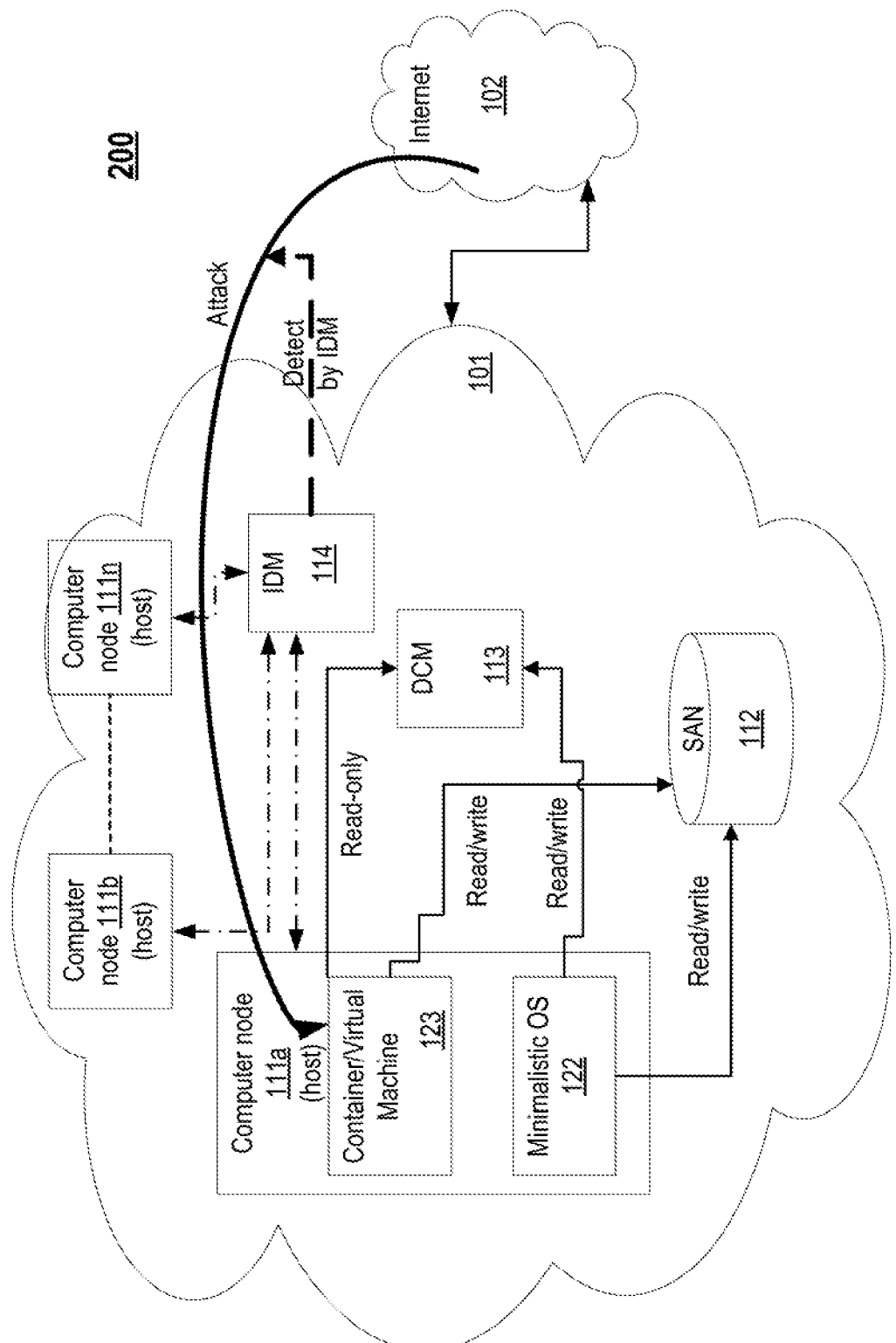
FIG. 2 is a block diagram illustrating the cloud infrastructure in which an IDM detects an attack on computing device in accordance to teachings of the present disclosure.

FIG. 2 is a block diagram illustrating the cloud infrastructure 200 in which the IDM 114 detects an attack on computing device 111a in accordance to teachings of the present disclosure. The attack may be via the internet 102. The IDM 114 sends a notification to the minimalistic OS 122 of computing device 111a. When the minimalistic OS 122 receives the notification from the IDM 114, it re-deploys the master container 123.

Figure 3:
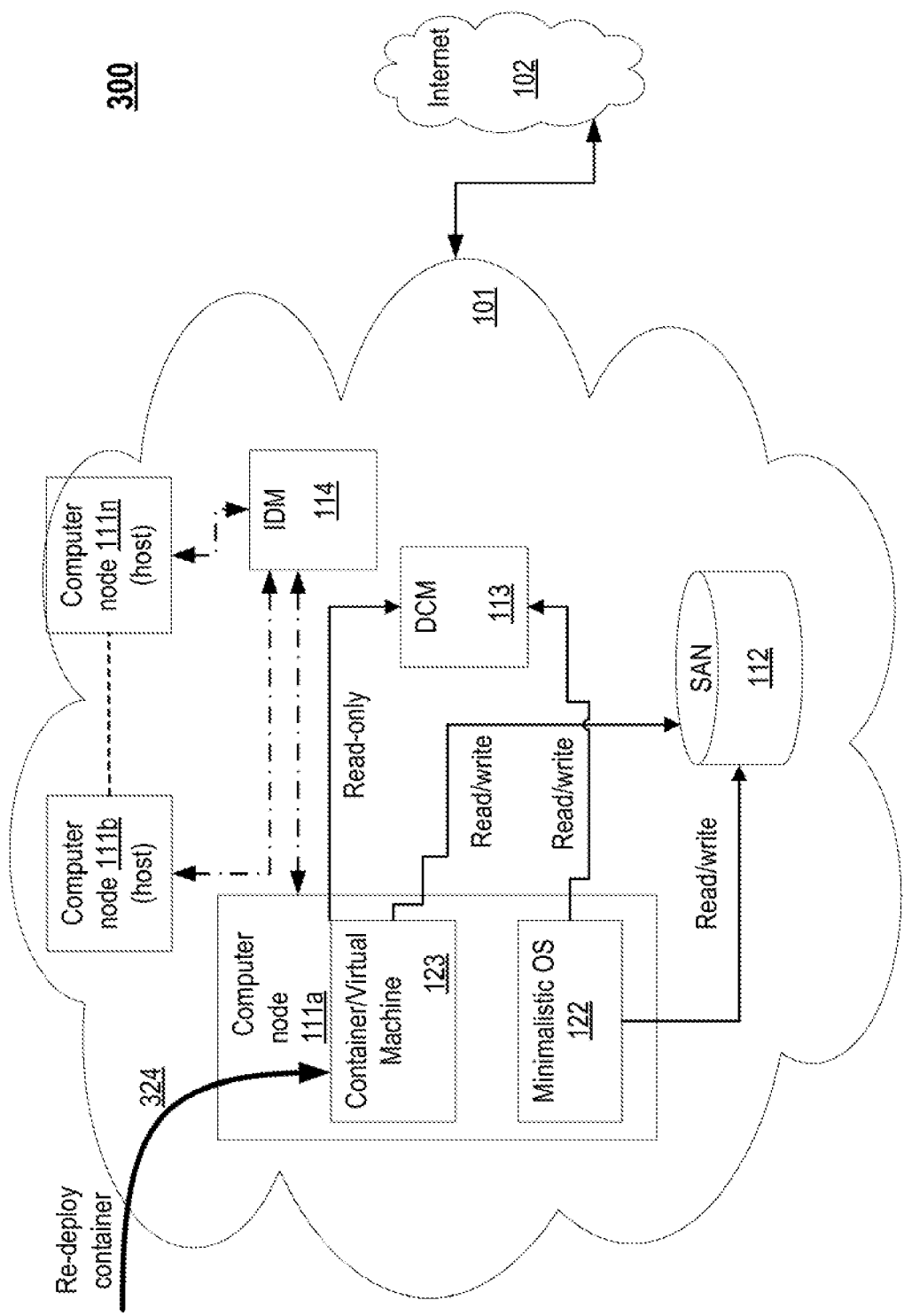
FIG. 3 is a block diagram illustrating the cloud infrastructure in which the minimalistic OS re-deploys the master container in accordance with the teachings of the present disclosure.

FIG. 3 is a block diagram illustrating the cloud infrastructure 300 in which the minimalistic OS 122 re-deploys the master container in accordance with the teachings of the present disclosure. The minimalistic OS re-deploys the master container, as shown by the arrow 324, and re-attaches the newly re-deployed master container to the SAN 112 and DCM 113. In one aspect, the re-deploying of the master container comprises: destroying the master container (the previously deployed master container); creating and starting a new master container from a container image (e.g., from the same container image); providing to the newly created master container access to the SAN volume; providing to the newly created master container a read-only access to the DCM domain, the domain being where the configuration of the computing device is stored; and invoking the IDM to start detecting intrusions into the newly created master container, wherein the newly created and deployed master container acts as a default runtime environment on the computing device.

In one aspect, the re-deployment includes taking a snapshot prior to destruction of the previous master container to allow for analysis (postmortem) of the intrusion.

In one aspect, when the master container is being re-deployed, a new master container is created from scratch.

In one aspect, when the master container is being re-deployed, a new master container is created by re-creating a previously stored master container. For example, the method may include check-pointing on disk the location of created master containers.

In one aspect, changes to configuration are allowed only when the changes are invoked from a minimalistic OS (or, a cluster component within the private network (home network)), which is not accessible from a public network.

In one aspect, the master container is not allowed to perform any changes in the configuration of the computing device stored on the DCM. In one aspect, the master container has only read-only access to the DCM. In one aspect, the minimalistic OS has a read-write access to the DCM. In one aspect, changes to the configuration of the computing device are performed only from a private (home) network, wherein the private network is inaccessible from a public network, and the DCM is inaccessible from the public network.

In one aspect, the SAN and the DCM are accessible to the computing device only via the private network and are not accessible from the internet.

In one aspect, the configuration of the computing device stored in the DCM includes at least one of: network configuration files, storage configuration files, user configuration files, and security credentials of the computing device, wherein the security credentials include at least one of: a token, a key, and a password.

In one aspect, a system and method is provided for recovering a computing device after an intrusion is detected. In one aspect, the method comprises a minimalistic Operating System (OS) running on a computing device, the device having a processor and a memory, wherein the minimalistic OS deploys a master container by: (1) creating and starting the master container from a container image, (2) providing, to the master container, access to a storage area network (SAN) volume, (3) providing, to the master container, read-only access to a Distributed Configuration Management (DCM) module domain, the domain being where a configuration of the computing device is stored, and (4) invoking an Intrusion Detection Module (IDM) to start detecting intrusions into the master container; and upon receiving a notification from the IDM about an intrusion into the computing device, the minimalistic OS re-deploys the master container from the container image, wherein the deployed master container acts as a default runtime environment on the computing device.

Figure 4:
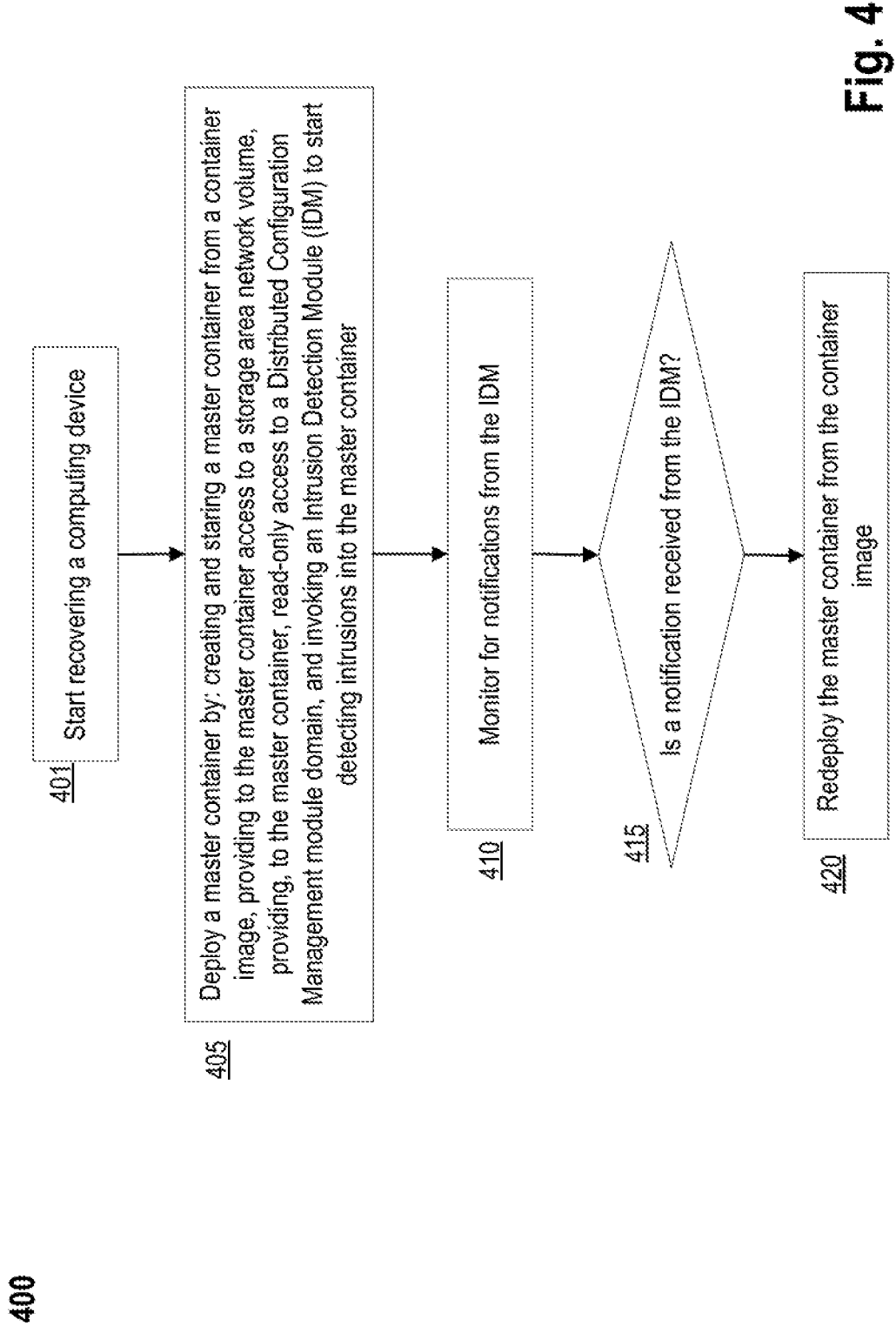
FIG. 4 is a flow diagram of the method for recovering a computing device after an intrusion is detected in accordance with the teachings of the disclosure.

FIG. 4 is a flow diagram of the method 400 for recovering a computing device after an intrusion is detected in accordance with one aspect of the disclosure. The steps of the method are performed by a minimalistic OS deployed running on the computing device. The minimalistic OS receives notifications of attacks from an IDM, e.g., IDM 114, via a private network. The arrangement between the IDM and the computing devices regarding notifications may be via a subscription type of service. For example, the IDM may receive subscriptions from any number of computing devices of a cluster and provide, to each subscriber, notifications regarding intrusions of the master container. The method 400 starts in step 401 and proceeds to step 405.

In step 405, method 400 deploys a master container by: (1) creating and starting the master container from a container image, (2) providing, to the master container, access to a storage area network (SAN) volume, (3) providing, to the master container, read-only access to a Distributed Configuration Management (DCM) module domain, the domain where a configuration of the computing device is stored, and (4) invoking an Intrusion Detection Module (IDM) to start detecting intrusions into the master container.

In step 410, method 400 monitors for notifications from the IDM.

In step 415, method 400 determines whether a notification is received from the IDM. If a notification is not received, the method returns to step 410. If at least one notification is received from the IDM the method proceeds to step 420.

In step 420, method 400 re-deploys the master container from the container image, wherein the deployed master container acts as a default runtime environment on the computing device. The method then returns to step 410.

In one aspect, the computing device is a compute node in a cluster, wherein the cluster comprises a plurality of compute nodes, a storage area network (SAN) that includes a network of shared storage area networks, a Distributed Configuration Management (DCM) module that is used for keeping configurations of computing devices of the cluster, and an Intrusion Detection Module (IDM) that is used for detecting when a computing device of the plurality of computing devices is compromised.

In one aspect, the re-deploying of the master container comprises: destroying the master container (the previously deployed master container); creating and starting a new master container from the container image; providing to the newly created master container access to the SAN volume; providing to the newly created master container a read-only access to the DCM domain, the domain being where the configuration of the computing device is stored; and invoking the IDM to start detecting intrusions into the newly created master container, wherein the newly created and deployed master container acts as a default runtime environment on the computing device.

In one aspect, the container image includes at least one of: all software needed for the node to operate, information about needed persistent volume, and information about a corresponding DCM sub-domain (i.e., sub-domain for the location at which the configuration of the computing device is kept).

In one aspect, the minimalistic OS includes: a container management software; and any number of software modules for supporting communication between the minimalistic OS and the SAN, the cluster management modules DCM and the IDM.

In one aspect, the SAN is accessed via a network storage driver of the minimalistic OS of the computing device.

In one aspect, the software module for communicating with the IDM comprises a module for a notification subscription to the IDM, wherein the IDM provides notifications to the minimalistic OS in accordance with a notification subscription by the minimalistic OS of the respective computing device.

In one aspect, the configuration of the computing device stored in the DCM includes at least one of: network configuration files, storage configuration files, user configuration files, and security credentials of the computing device, wherein the security credentials include at least one of: a token, a key, and a password.

In one aspect, the master container is the only container running on the computing device.

In one aspect, the IDM comprises a crontab monitor or an artificial intelligence (AI) based system.

In one aspect, the DCM comprises a Network File System (NFS) share or an eted-system.

In one aspect, the SAN and the DCM are accessible to the computing device only via a private network.

In one aspect, the master container is not allowed to perform any changes in the configuration of the computing device stored on the DCM, in one aspect, the master container has only read-only access to the DCM, in one aspect, the minimalistic OS has a read-write access to the DCM, in one aspect, changes to the configuration of the computing device are performed only from a private network, wherein the private network is inaccessible from a public network, and the DCM is inaccessible from the public network. In one aspect, neither the minimalistic OS nor the master container can have access to domains corresponding to other compute nodes.

In one aspect, the re-deploying of the master container comprises: taking a snapshot of the master container currently in use; and destroying the master container after the snapshot has been taken to allow for analysis of the intrusion.

In one aspect, the providing, to the master container, access to the SAN volume and to the DCM domain comprises: determining a SAN volume and a DCM domain based on the configuration of the computing device; and granting, to the started master container, access to the determined SAN volume and DCM domain.

In one aspect, a virtual machine may be used instead of the container (e.g., exactly in the same manner). I.e., the minimalistic OS runs a Virtual Machine which is a default runtime environment and is re-deployed upon intrusion detection. The VM may is deployed on the OS, and has access to SAN and DCM. In other words, the same method can be used with an another type of virtualization.

In one aspect, the master contain is configured to store data needed by a user of the computing device in a respective volume of the SAN, wherein the stored data includes at least one of: databases of the user, files of the user, and logs. For example, all the software needed by the owner is included in the container image. In other words, databases, clients' files, logs, etc. are stored in the container image which is in the respective SAN volume.

Figure 5:
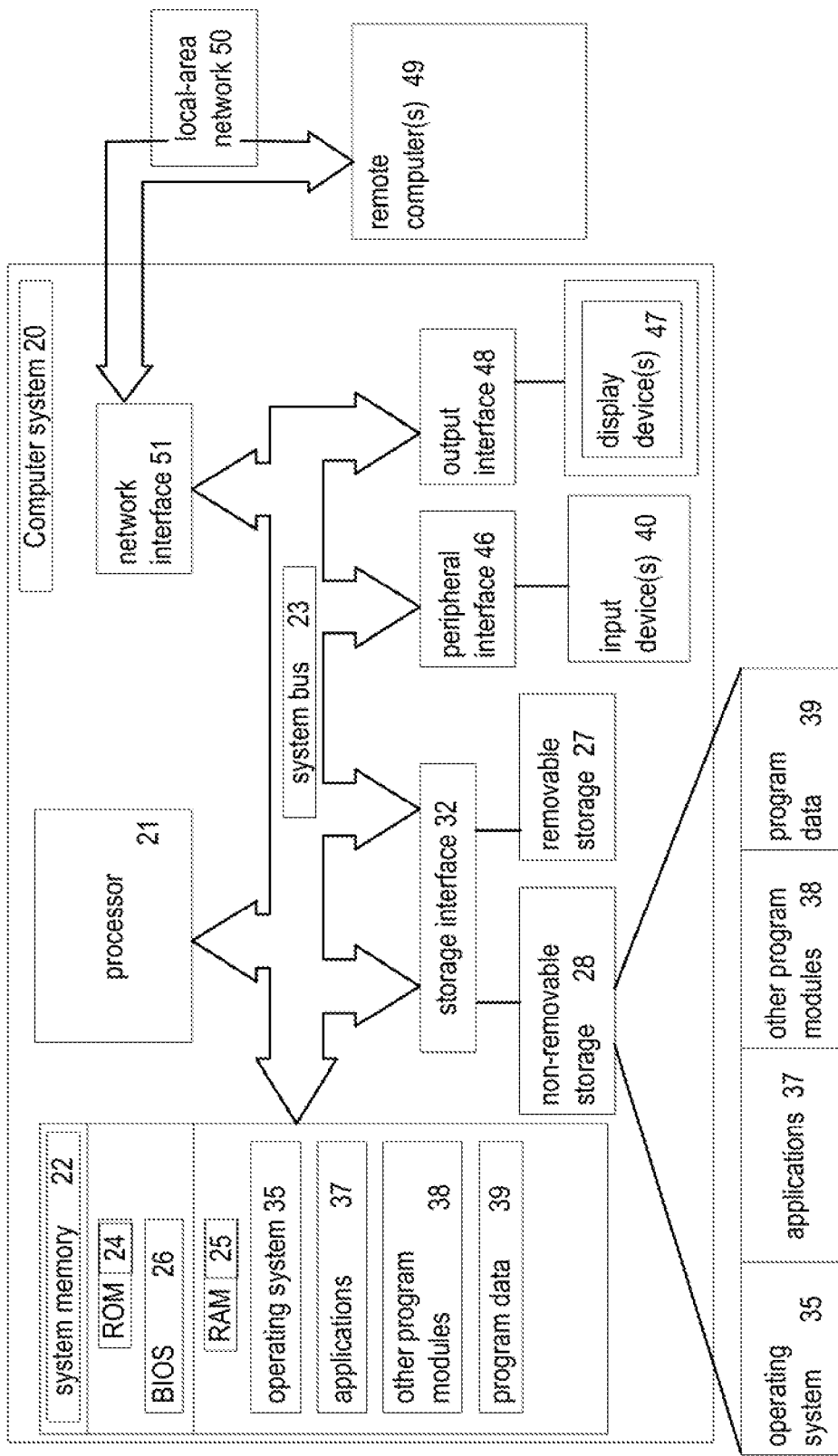
FIG. 5 is a block diagram illustrating a general-purpose computer system on which aspects of the present disclosure may be implemented in accordance with an exemplary aspect.

FIG. 5 is a block diagram illustrating a computer system 20 on which aspects of systems and methods for recovering a computing device after an intrusion in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for recovering a computing device after an intrusion, the method comprising:
deploying, by a minimalistic Operating System (OS) running on the computing device having a processor and a memory, a master container, wherein the deploying of the master container comprising:
creating and starting the master container from a container image,
providing, to the master container, access to a storage area network (SAN) volume,
providing, to the master container, read-only access to a Distributed Configuration Management (DCM) module domain, the domain where a configuration of the computing device is stored, and invoking an Intrusion Detection Module (IDM) to start detecting intrusions into the master container; and upon receiving a notification from the IDM about an intrusion into the master container, re-deploying, by the minimalistic OS, the master container from the container image, wherein the re-deployed master container acts as a default runtime environment on the computing device;

wherein the re-deploying of the master container comprises:
destroying the master container;
creating and starting a new master container from the container image; and
providing to the newly created master container a read-only access to the DCM module.

2. The method of claim 1, wherein the computing device act as a compute node in a cluster, wherein the cluster comprises: a plurality of compute nodes, a storage area network, wherein the DCM is a cluster management module for keeping configurations of compute nodes, and the IDM is a cluster management module for detecting when a compute node is compromised.

3. The method of claim 1, wherein the re-deploying of the master container further comprises:
providing to the newly created master container access to the SAN volume; and
invoking the IDM to start detecting intrusions into the newly created master container.

4. The method of claim 1, wherein the container image includes at least one of: software needed for the computing device to operate, information about needed persistent volume, and information about a corresponding DCM subdomain.

5. The method of claim 1, wherein the minimalistic OS includes: a container management software, and any number of software modules for responsible communicating between the minimalistic OS and the SAN, the DCM and the IDM.

6. The method of claim 1, wherein the SAN is accessed via a network storage driver of the minimalistic OS of the computing device, and the software module for communicating with the IDM comprises a module for a notification subscription to the IDM, wherein the IDM provides notifications to the minimalistic OS in accordance with a notification subscription by the minimalistic OS of the respective computing device.

7. The method of claim 1, wherein the configuration of the computing device stored in the DCM includes at least one of: network configuration files, storage configuration files, user configuration files, and security credentials of the computing device, wherein the security credentials include at least one of: a token, a key, and a password.

8. The method of claim 1, wherein the master container is the only container running on the computing device.

9. The method of claim 1, wherein the IDM comprises a crontab monitor or an artificial intelligence (AI) based system, and the DCM comprises a Network File System (NFS) share or an eted system.

10. The method of claim 1, wherein the SAN and the DCM are accessible to the computing device only via a private network.

11. The method of claim 1, further comprising at least one of:
the master container is not allowed to perform any changes in the configuration of the computing device stored on the DCM, or the master container has only read-only access to the DCM, or
the minimalistic OS has a read-write access to the DCM, or
changes to the configuration of the computing device are performed only from a private network, wherein the private network is inaccessible from a public network, or
the DCM is inaccessible from the public network.

12. The method of claim 1, wherein the re-deploying of the master container further comprises taking a snapshot of the master container currently in use to allow for analysis of the intrusion.

13. The method of claim 1, wherein the providing, to the master container, access to the SAN volume and to the DCM domain comprises:
determining a SAN volume and a DCM domain based on the configuration of the computing device; and
granting, to the started master container, access to the determined SAN volume and DCM domain.

14. The method of claim 1, wherein a virtual machine may be used instead of the container.

15. The method of claim 1, wherein the master container is configured to store data needed by a user of the computing device in a respective volume of the SAN, wherein the stored data includes at least one of: databases of the user, files of the user, and logs.

16. A system for recovering a computing device after an intrusion, the system comprising:
a hardware processor of the computing device executing a minimalistic Operating System (OS) configured to:
deploy a master container by: creating and starting the master container from a container image, providing, to the master container, access to a storage area network (SAN) volume, providing, to the master container, read-only access to a Distributed Configuration Management (DCM) module domain, the domain where a configuration of the computing device is stored, and invoking an Intrusion Detection Module (IDM) to start detecting intrusions into the master container; and
upon receiving a notification from the IDM about an intrusion into the master container, re-deploy the master container from the container image, wherein the re-deployed master container acts as a default runtime environment on the computing device;
wherein the re-deploying of the master container comprises:
destroying the master container:
creating and starting a new master container from the container image; and
providing to the newly created master container a read-only access to the DCM module.

17. The system of claim 16, wherein the re-deploying the master container further comprises:
providing to the newly created master container access to the SAN volume;
invoking the IDM to start detecting intrusions into the newly created master container.

18. The system of claim 16, wherein:
the master container is not allowed to perform any changes in the configuration of the computing device stored on the DCM,
the master container has only read-only access to the DCM,
the minimalistic OS has a read-write access to the DCM, changes to the configuration of the computing device are performed only from a private network, wherein the private network is inaccessible from a public network, and the DCM is inaccessible from the public network.

19. A non-transitory computer readable medium storing thereon computer executable instructions for recovering a computing device after an intrusion, including instructions for:

by a minimalistic Operating System (OS) running on the computing device having a processor and a memory, deploying a master container by:

creating and starting the master container from a container image, providing, to the master container, access to a storage area network (SAN) volume, providing, to the master container, read-only access to a Distributed Configuration Management (DCM) module domain, the domain where a configuration of the computing device is stored, and invoking an Intrusion Detection Module (IDM) to start detecting intrusions into the master container; and upon receiving a notification from the IDM about an intrusion into the master container, by the minimalistic OS, re-deploying, the master container from the container image, wherein the re-deployed master container acts as a default runtime environment on the computing device;

wherein the re-deploying of the master container comprises:

destroying the master container:

creating and starting a new master container from the container image; and providing to the newly created master container a read-only access to the DCM module.

20. The non-transitory computer readable medium of claim 19, the instructions for re-deploying of the master container includes instructions for:

providing to the newly created master container access to the SAN volume; and invoking the IDM to start detecting intrusions into the newly created master container.

* * * * *